(12) United States Patent
Omata et al.

(10) Patent No.: US 9,077,278 B2
(45) Date of Patent: Jul. 7, 2015

(54) AC MOTOR CONTROL APPARATUS

(71) Applicant: DENSO CORPORATION, Kariya, Aichi-pref. (JP)

(72) Inventors: Ryuji Omata, Anjo (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/774,590

(22) Filed: Feb. 22, 2013

(65) Prior Publication Data

US 2013/0214711 A1    Aug. 22, 2013

(30) Foreign Application Priority Data

Feb. 22, 2012    (JP) ................................ 2012-35959

(51) Int. Cl.
| | |
|---|---|
| *H02P 21/00* | (2006.01) |
| *H02P 1/46* | (2006.01) |
| *H02M 5/45* | (2006.01) |
| *H02P 21/14* | (2006.01) |

(52) U.S. Cl.
CPC ............ *H02P 21/14* (2013.01); *H02P 21/0035* (2013.01)

(58) Field of Classification Search
CPC ......... H02P 27/06; H02P 21/14; H02P 27/00; H02P 6/08
USPC ........................ 318/400.02, 701, 801; 363/37
See application file for complete search history.

(56) References Cited

U.S. PATENT DOCUMENTS

| | | | |
|---|---|---|---|
| 6,229,719 B1* | 5/2001 | Sakai et al. .................... 363/37 |
| 6,781,333 B2 | 8/2004 | Koide et al. | |
| 8,143,838 B2 | 3/2012 | Akiyama | |
| 2001/0002784 A1 | 6/2001 | Masaki et al. | |
| 2004/0051495 A1 | 3/2004 | Kaneko et al. | |
| 2004/0263114 A1 | 12/2004 | Kaneko et al. | |
| 2006/0006825 A1 | 1/2006 | Inaguma et al. | |
| 2007/0069681 A1 | 3/2007 | Imura et al. | |
| 2008/0079385 A1 | 4/2008 | Hashimoto et al. | |

(Continued)

FOREIGN PATENT DOCUMENTS

| | | |
|---|---|---|
| GB | 2481328 | 12/2011 |
| JP | 10-225199 | 8/1998 |
| JP | 2000-175483 | 6/2000 |

(Continued)

OTHER PUBLICATIONS

Omata et al, U.S. Appl. No. 13/774,619, filed Feb. 22, 2013.

(Continued)

*Primary Examiner* — Bentsu Ro
*Assistant Examiner* — Zemenay Truneh
(74) *Attorney, Agent, or Firm* — Nixon & Vanderhye P.C.

(57) ABSTRACT

A motor control circuit calculates, based on a sensed current of a sensor phase sensed by a current sensor, an estimated current of the other phase and calculates a d-axis and a q-axis estimated currents based on the sensed current of the sensor phase and the estimated current of the other phase. The motor control circuit further calculates a d-axis and a q-axis command voltages based on the estimated currents thereby to control power supply to the AC motor. When the sensed current of the sensor phase is 0 [A], the command voltages are fixed and the estimated current is interpolated. Thus, variations of the command voltages caused by an error in the estimated current are reduced and a rapid change in the estimated current is reduced.

10 Claims, 8 Drawing Sheets

(56) References Cited

U.S. PATENT DOCUMENTS

| | | | |
|---|---|---|---|
| 2008/0129243 A1* | 6/2008 | Nashiki | 318/701 |
| 2008/0157709 A1* | 7/2008 | Tobari et al. | 318/801 |
| 2009/0160377 A1 | 6/2009 | Yamada | |
| 2010/0194329 A1 | 8/2010 | Lu et al. | |
| 2010/0207555 A1 | 8/2010 | Ide et al. | |
| 2011/0248659 A1 | 10/2011 | Balazovic et al. | |
| 2012/0007528 A1* | 1/2012 | Nakatsugawa et al. | 318/400.02 |
| 2012/0212162 A1* | 8/2012 | Wu et al. | 318/400.02 |

FOREIGN PATENT DOCUMENTS

| | | |
|---|---|---|
| JP | 2004-64903 | 2/2004 |
| JP | 2004-159391 | 6/2004 |

OTHER PUBLICATIONS

Omata et al, U.S. Appl. No. 13/774,667, filed Feb. 22, 2013.
Omata et al, U.S. Appl. No. 13/774,279, filed Feb. 22, 2013.
Omata et al, U.S. Appl. No. 13/774,295, filed Feb. 22, 2013.
Office Action (1 page) dated Jan. 24, 2014 issued in corresponding Japanese Application No. 2012-035961 and English translation (1 page).
Office Action (11 pgs.) dated Oct. 6, 2014 issued in co-pending U.S. Appl. No. 13/774,619.
Office Action (11 pgs.) dated Oct. 8, 2014 issued in co-pending U.S. Appl. No. 13/774,667.
Office Action (15 pages) dated Feb. 6, 2015 issued in co-pending U.S. Appl. No. 13/774,667.
Office Action (11 pages) dated Feb. 13, 2015 issued in co-pending U.S. Appl. No. 13/774,619.
Office Action (9 pages) dated Sep. 3, 2014, issued in copending U.S. Appl. No. 13/774,279 to Omata, filed Feb. 22, 2013.
Notice of Allowance dated Apr. 3, 2015 issued in co-pending U.S. Appl. No. 13/774,279 (10 pgs.).

* cited by examiner

AC MOTOR CONTROL APPARATUS

CROSS REFERENCE TO RELATED APPLICATION

The present application is based on and incorporates herein by reference Japanese patent application 2012-35959 filed on Feb. 22, 2012.

TECHNICAL FIELD

The present disclosure relates to an AC motor control apparatus including a three-phase motor and a current sensor for sensing a current in one phase of the motor.

BACKGROUND

In recent years, because of the global need for lower fuel consumption and less exhaust emission, electric and hybrid vehicles mounted with an AC motor as a mechanical power source are proposed. By way of example, a hybrid vehicle is mounted with a DC power supply, which may be a secondary battery, an electric power converter, which includes inverters, and AC motors. The power supply is connected to the motors via the power converter. The inverters convert the DC voltage from the power supply into AC voltages for driving the motors.

The hybrid or electric vehicle is provided with a control apparatus, which includes two or three current sensors for sensing the currents in two phases or three phases of a three-phase motor. The apparatus controls the motor according to the outputs (sensed currents) from the current sensors. Thus, it is necessary to provide two or three current sensors for each of motors. This results in a bar to simplification of the parts of the inverter that include three-phase output terminals. This also results in a bar to reduction of the cost of a motor control system of the vehicle.

Patent documents 1 (JP 2004-64903A), 2 (JP H10-225199A), 3 (JP 2001-145398A, U.S. Pat. No. 6,229,719) and 4 (JP 2004-159391A) disclose exemplary AC motor control apparatuses, which use one current sensor relative to plural phases.

In patent document 1, one current sensor is provided in a DC power supply line to sense a current flowing in a bus. If the current sensor is provided in the DC power supply line in a control system for a high power AC motor mounted in a vehicle, not only the assembling work near the DC power supply line is complicated but also extension of the DC power supply line causes current conduction noise. Thus an inverter will become large and expensive.

In patent document 2, a d-axis current Id and a q-axis current Iq are calculated from a sensed current of one phase among three phases by using a state equations determined in accordance with motor constants. According to this technology, since the motor constants vary with temperature, it is likely that an estimation error becomes large when the d-axis current Id and the q-axis current Iq are calculated by solving the state equations. Thus motor control cannot be stabilized. Further, complicated calculation processing is needed and hence it is not readily possible to implement such a technology in a control ECU (microcomputer).

In patent document 3, a d-axis current Id and a q-axis current Iq of an AC motor are calculated by d-q conversion of a sensed current of one phase among three phases and estimated phase currents of other two phases. The currents Id and Iq are averaged by first-order delay filters and inversely d-q converted to estimate phase currents of the other two phases. According to this technology, a delay is caused in the estimated current and motor control cannot be stabilized by an influence of a first-order delay filter provided for averaging, when a torque change or a rotation speed change is required as in a vehicle.

In patent document 4, one current sensor is provided for sensing a current flowing in one phase (for example, U-phase) among phases of an AC motor and currents of the other two phases (for example, V-phase and W-phase) are estimated based on a current of one phase (for example, U-phase) sensed by the current sensor, d-axis and q-axis command currents, and electrical angle information of the AC motor.

Specifically, this technique includes: determining a U-phase current phase angle $\theta'$ $(=\theta+\alpha)$ by adding the command current phase angle $\alpha$ between the q-axis and the vector resultant from the d-axis command current Id* and q-axis command current Iq* of the AC motor to the angle $\theta$ between the rotor of the motor and the U-phase axis of the stator of the motor; calculating a current amplitude Ia from the U-phase current phase angle $\theta'$ and the sensed current Iu in the U-phase according to the following equation (A); calculating estimated currents Iv and Iw in the V-phase and W-phase respectively from the current amplitude Ia and U-phase current phase angle $\theta'$ according to the following equations (B) and (C); calculating an d-axis estimated current Id and an q-axis estimated current Iq from the sensed current Iu in the U-phase and the estimated currents Iv and Iw in the V-phase and W-phase respectively; and performing the feedback control of the current in the AC motor by so calculating a command voltage for the motor that the estimated currents Id and Iq equal the command currents Id* and Iq* respectively.

$$Ia = Iu/[rl;\sqrt{1/3}rlx\times\{-\sin(\theta')\}] \tag{A}$$

$$Iv = \sqrt{(1/3)}\times Ia\times\{-\sin(\theta'+120°)\} \tag{B}$$

$$Iw = \sqrt{(1/3)}\times Ia\times\{-\sin(\theta'+240°)\} \tag{C}$$

A d-axis estimated current Id and a q-axis estimated current Iq are calculated based on the sensed current Iu of one phase and the estimated currents Iv and Iw of the other two phases. Command voltages for the AC motor are calculated and the current flowing to the AC motor is feedback-controlled so that the estimated currents Id and Iq attain the command currents Id* and Iq*. However, according the technology of patent document 4, the current amplitude Ia is calculated by dividing Iu by 0 in the equation (A) when $\sin(\theta')$ becomes 0 at a U-phase current phase angle $\theta'=0[°]$. The current amplitude Ia thus cannot be calculated accurately and hence the other two estimated currents Iv and Iw cannot be calculated accurately either. The other two estimated currents Iv and Iw are calculated as Iv=0 [A] and Iw=0 [A] by the equations (B) and (C), respectively, when the detected current Iu becomes 0. In this case, it becomes impossible to control the AC motor.

SUMMARY

It therefore an object to provide an AC motor control apparatus, which stably drives an AC motor having a current sensor in only one of three phases of a three-phase AC motor (one phase among three-phase outputs of an inverter).

An AC motor control apparatus is provided for a system, which includes a three-phase AC motor having a first phase, a second phase and a third phase, and a current sensor for sensing a current flowing in the first phase. The AC motor control apparatus includes a current estimating part and a controlling part. The current estimating part is configured to calculate an estimated current of at least the second phase based on a sensed current of the first phase and electrical angle of the AC motor and calculate a d-axis estimated current and a q-axis estimated current in a rotating coordinate system of the AC motor based on the sensed current of the first phase and the estimated current of at least the second phase. The controlling part is configured to control electric power supply to the AC motor by using the d-axis estimated current and the q-axis estimated current. The current estimating part includes an interpolation part.

In one aspect, the interpolation part is configured to interpolate the estimated current of at least the second phase by fixing a command related to a voltage of the AC motor at a zero-crossing time of the sensed current of the first phase.

The command related to the voltage of the AC motor may be d-axis and q-axis voltage commands, three-phase AC voltage command, voltage vector phase, voltage vector amplitude or any other parameters related to motor control.

The zero-crossing time includes a case, in which the current detection value of the first phase is 0 or in a predetermined range including 0.

In another aspect the interpolation part is configured to hold the d-axis estimated current and the q-axis estimated current at previous or further older values and interpolates the estimated current of at least the second phase based on held values at a zero-crossing time of the sensed current of the first phase. The zero-crossing time includes a case, in which the current detection value of the first phase is 0 or in a predetermined range including 0.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT

An AC motor control apparatus will be described below with reference to embodiments, which are applied to a driving system of a hybrid vehicle mounted with AC motors and an internal combustion engine as mechanical power parts.

First Embodiment

Figure 1:
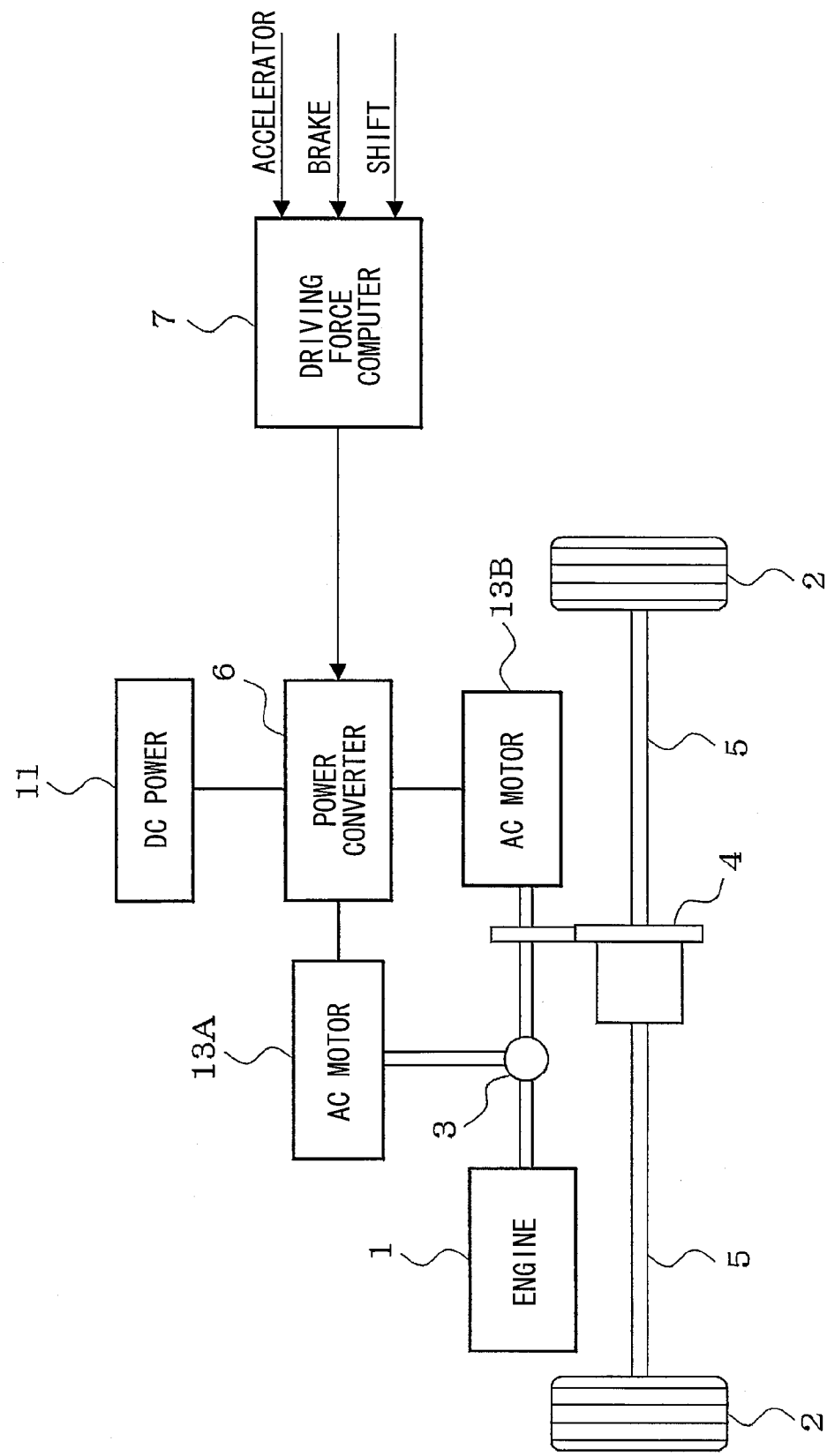
FIG. 1 is a schematic diagram of a driving system of a hybrid vehicle.

Referring to FIG. 1, a hybrid vehicle is mounted with an internal combustion engine 1, a first AC motor 13A, and a second AC motor 13B. The driving of the first AC motor 13A by the output from the engine 1 transmits driving force to a shaft of the second AC motor 13B. Mainly, the transmitted driving force and the driving force of the second AC motor 13B drive tire wheels 2 fixed to an axle 5. The crankshaft of the engine 1 and the shafts of the motors 13A and 13B are coupled together by a mechanical power divider 3 (for example, a planetary gear mechanism). The shaft of the second AC motor 13B is coupled to the axle 5 by a differential reduction gear 4. The motors 13A and 13B are connected to a DC power supply 11, which may be a secondary battery, via an electric power converter 6, which includes inverters. The motors 13A and 13B transmit electric power to the power supply 11 and receive electric power from it through the converter 6.

A driving force computer circuit 7 includes a computer for controlling the whole vehicle. The computer circuit 7 detects an operating state of the vehicle by reading in an accelerator signal output from an accelerator sensor (not shown), a brake signal output from a brake switch (not shown), a shift signal output from a shift switch (not shown), and signals output from other sensors and switches. The computer circuit 7 exchanges control signals, data signals, etc. with an engine control circuit (not shown), which controls the operation of the engine 1, and a motor control circuit 16 (FIG. 2), which controls the operation of the motors 13A and 13B. The computer circuit 7 controls the driving force of the engine 1 and motors 13A and 13B by outputting a driving force requirement according to the operating state of the vehicle.

Figure 2:
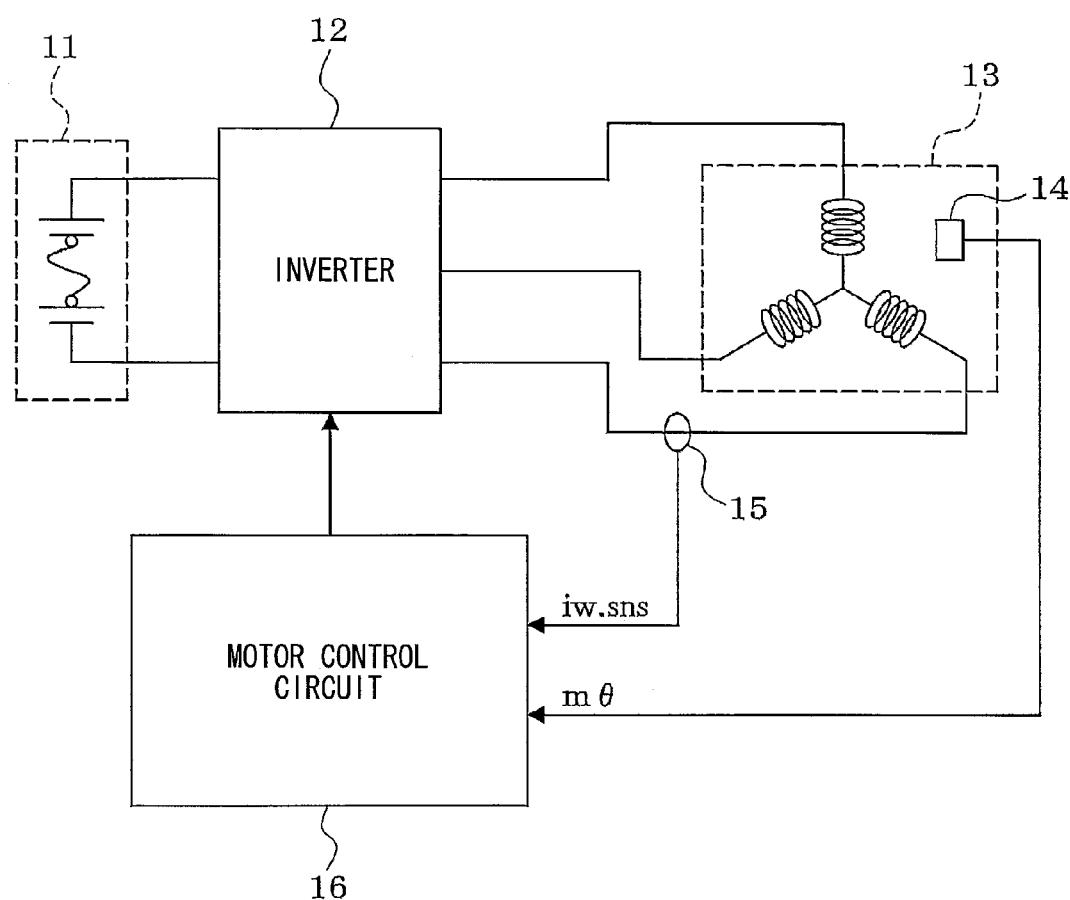
FIG. 2 is a schematic diagram of an AC motor control apparatus, which is applied to the driving system shown in FIG. 1, according to a first embodiment.

As shown in FIG. 2, the AC motor control apparatus is mounted on the hybrid vehicle. Because the AC motor control apparatus for the AC motors 13A and 13B are substantially identical in structure, the AC motor control apparatus for an AC motor 13 representing the motors 13A and 13B will be described below.

The DC power supply 11, which may be a secondary battery, is connected to a voltage-controlled three-phase inverter 12, which drives the AC motor 13. Alternatively, the power supply 11 may be connected to the inverter 12 via a boost converter or the like.

The AC motor 13 is a three-phase permanent-magnet synchronous motor with permanent magnets in its rotor. The motor 13 is mounted with a rotational position sensor 14 (for example, a resolver) for sensing the rotational position (rotational angle) of the rotor. The motor 13 is also mounted with only one current sensor 15 for sensing the current in one phase (sensor phase) of the motor 13. The current sensor 15 senses the current flowing in the W-phase as the sensor phase of the motor 13. The motor 13 may not be a permanent-magnet synchronous motor, but may be an induction motor or another synchronous motor. The sensor phase, for example W-phase, is exemplarily referred to as a first phase, and U-phase and V-phase are referred to as a second phase and a third phase.

The inverter 12 converts the DC voltage from the DC power supply 11 into three-phase voltages U, V, and W in accordance with six three-phase arm voltage command signals UU, UL, VU, VL, WU and WL output from the motor control circuit 16 (controlling part). The inverter 12 drives the AC motor 13 by applying the voltages U, V, and W to the motor 13.

The motor control circuit 16 controls a switching operation of the inverter and regulates three-phase AC voltages supplied to the AC motor 13 so that an output torque of the AC motor 13 attains a target torque. For this purpose, the current flowing in the sensor phase of the AC motor 13 is detected and feedback-controlled (current F/B control) so that a deviation between the command current, which corresponds to the target torque, and an estimated current (described later), which is calculated based on control information such as detection values of the current sensor 15 and the rotational position sensor 14, is reduced.

Figure 3:
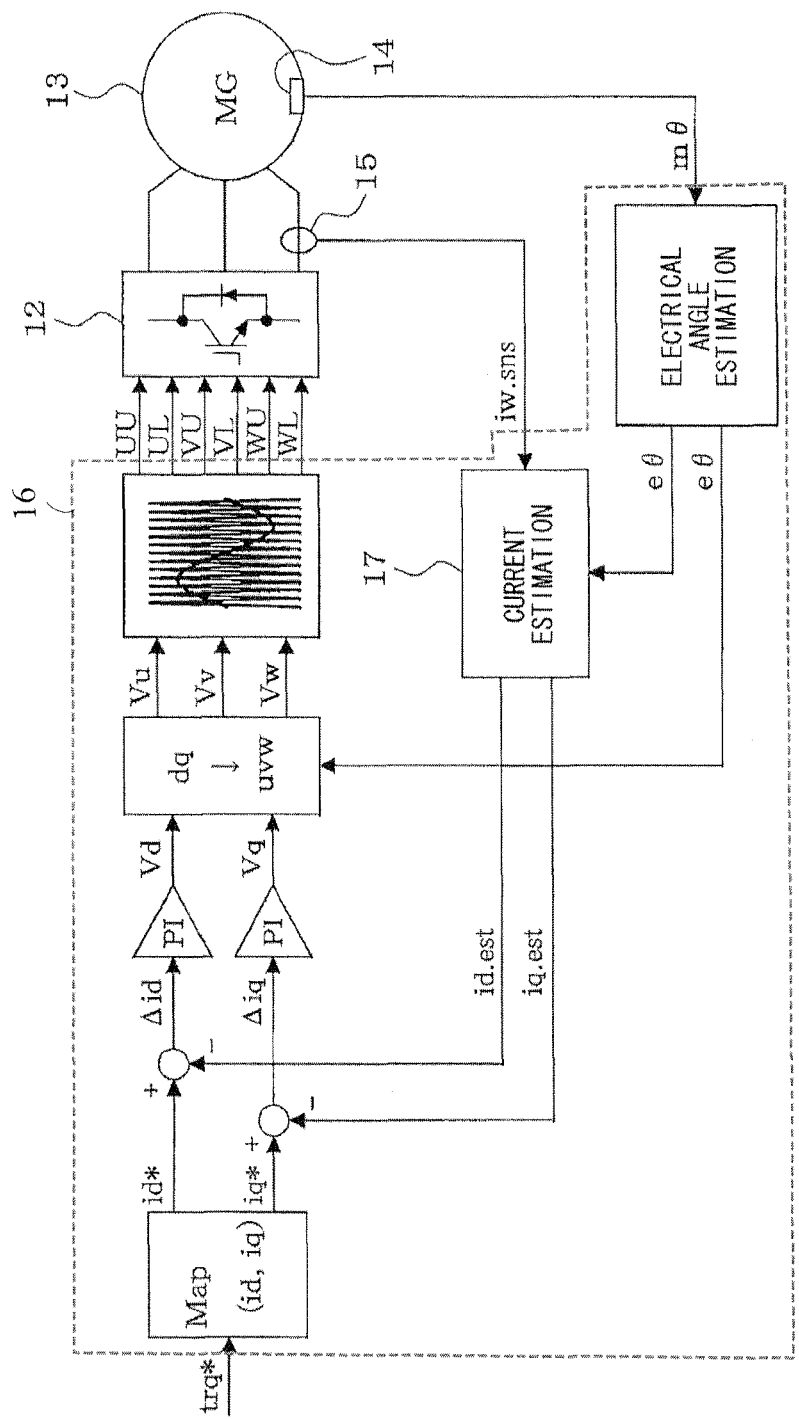
FIG. 3 is a block diagram showing a current feedback control for an AC motor of the hybrid vehicle.

As shown in FIG. 3, the motor control circuit 16 calculates, based on a command torque trq* and by using data map or mathematical equations, a d-axis command current id* and a q-axis command current iq* (those may be expressed as a current command vector) in a rotating coordinate system (d-q coordinate system), which is set as a rotor rotating coordinate of the AC motor 13.

The motor control circuit 16 further calculates an electrical angle eθ based on the rotational position mθ (rotation angle) of the AC motor 13 detected by the rotational position sensor 14. In the motor control circuit 16, a current estimation part 17 calculates the d-axis estimated current id.est and the q-axis estimated current iq.est (these may be expressed as an estimation current vector) in the rotation coordinate system based on the sensed current iw.sns of the sensor phase (W-phase in this embodiment) of the AC motor 13 detected by the current sensor 15 and the electrical angle eθ of the AC motor 13. In addition, the command currents iu* and iv* of the other two phases (U-phase and V-phase) calculated by an inverse d-q conversion based on the d-axis command current id*, q-axis command current iq* and the electrical angle eθ of the AC motor 13.

The motor control circuit 16 then calculates a d-axis command voltage Vd and a q-axis command voltage Vq. The d-axis command voltage Vd is calculated by the PI control or the like to reduce a deviation Δid between the d-axis command current id* and the d-axis estimated current id.est. The q-axis command voltage Vq is calculated by the PI control or the like to reduce a deviation Δiq between the q-axis command current iq* and the q-axis estimated current iq.est.

The motor control circuit 16 calculates three-phase command voltages Vu, Vv and Vw based on the d-axis command voltage Vd, the q-axis command voltage Vq and the electrical angle eθ of the AC motor 13. The motor control circuit 16 then converts these three-phase command voltages Vu, Vv and Vw into three-phase six-arm voltage command signals UU, UL, VU, VL, WU and WL by a sine wave PWM control method. The motor control circuit 16 outputs the three-phase six-arm voltage command signals UU, UL, VU, VL, WU and WL to the inverter 12. The inverter 12 converts the DC voltage to three-phase AC voltages based on the three-phase six-arm voltage command signals UU, UL, VU, VL, WU and WL, and supplies these AC voltages to the motor 13. Thus the AC motor 13 generates torque when the three-phase currents are supplied. The motor control circuit 16 detects the AC current flowing in the sensor phase (W-phase) of the AC motor 13 and F/B-controls (current F/B control) the AC current so that the output torque attains the target torque Trq* (command torque). That is, the motor control circuit 16 operates to reduce a deviation between the command currents id* and iq* corresponding to the command torque and the estimated currents id.est and iq.est.

A method for estimating the current in the AC motor 13 by means of the current estimation part 17 will be described below.

Generally, the currents iu, iv and iw respectively in the three phases of the AC motor 13 vary at a phase difference of 120 degrees between them with the electrical angle eθ, the amplitude and phase of a current vector, and so on. By way of example, for the calculation of an estimated current iu.est in the U-phase of the motor 13 from the sensed W-phase current iw.sns, the current estimation part 17 may use the electrical angle xθ that is 0 degree when the sensed current iw.sns crosses zero (0 ampere) from a negative polarity to a positive polarity, and that is 180 degrees when this current crosses zero from the positive polarity to the negative polarity. The angle xθ is a current phase relative to the W-phase, and is equivalent to the angle between the W-phase and the current vector. In this case, the sensed current iw.sns and the estimated U-phase current iu.est can be expressed respectively by the following equations (1) and (2), where Ia is the current amplitude.

$$iw.sns = Ia \times \sin(x\theta) \tag{1}$$

$$iu.est = Ia \times \sin(x\theta - 120°) \tag{2}$$

By using the relationship expressed by the equation (1), it is possible to transform the equation (2) as follows.

$$\begin{aligned} iu \cdot est &= Ia \times \sin(x\theta - 120°) \\ &= -\frac{1}{2} \times Ia \times \sin(x\theta) - \frac{\sqrt{3}}{2} \times Ia \times \cos(x\theta) \\ &= -\frac{1}{2} \times iw \cdot sns - \frac{\sqrt{3}}{2} \times \frac{Ia \times \sin(x\theta)}{\tan(x\theta)} \\ &= \left\{-\frac{1}{2} - \frac{\sqrt{3}}{2} \times \frac{1}{\tan(x\theta)}\right\} \times iw \cdot sns \end{aligned}$$

This makes it possible to express the estimated U-phase current iu.est in the U-phase with the sensed W-phase current iw.sns and the current phase xθ relative to the W-phase by the following equation (3). This also makes it possible to express the estimated U-phase current iu.est to be expressed with an estimation factor fu(xθ) according to the current phase xθ by the following equation (4).

$$iu \cdot est = \left\{-\frac{1}{2} - \frac{\sqrt{3}}{2} \times \frac{1}{\tan(x\theta)}\right\} \times iw \cdot sns \tag{3}$$

$$iu \cdot est = fu(x\theta) \times iw \cdot sns \tag{4}$$

$$\text{where } fu(x\theta) = -\frac{1}{2} - \frac{\sqrt{3}}{2} \times \frac{1}{\tan(x\theta)} \tag{5}$$

Figure 4:
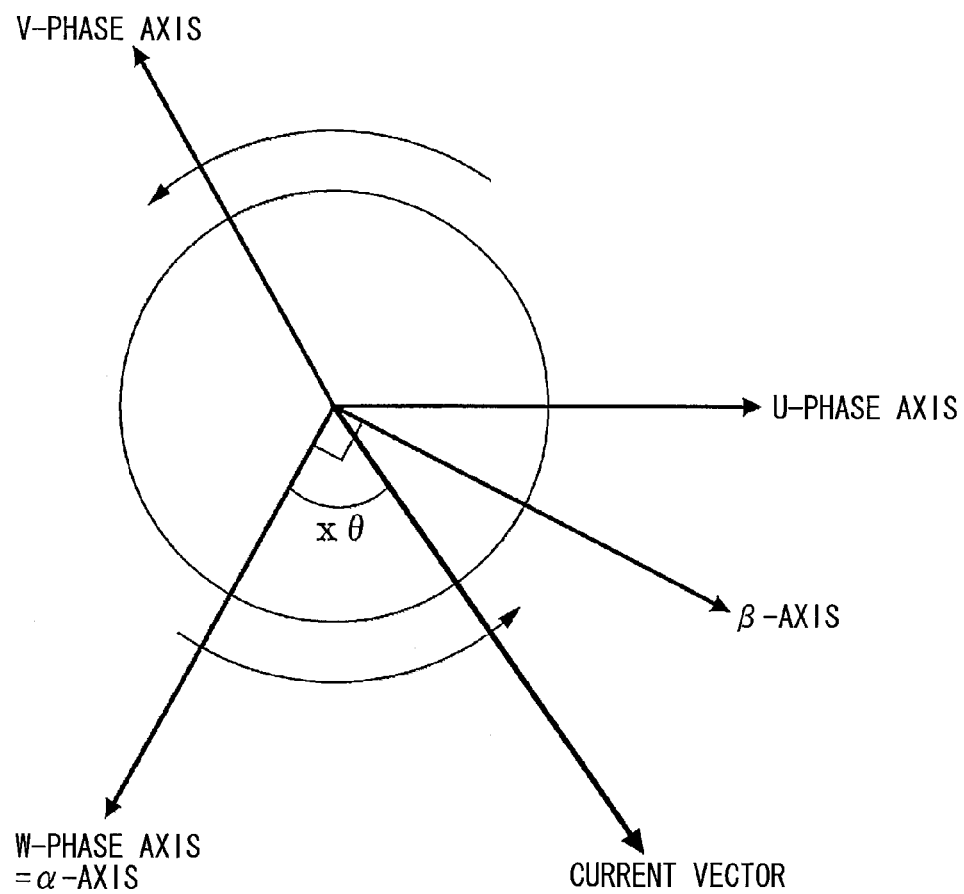
FIG. 4 shows a fixed coordinate system ($\alpha$-$\beta$ coordinate system) on a basis of a W-phase of the AC motor.

FIG. 4 shows a fixed coordinate system (α-β coordinate system) set with reference to the sensor phase (W-phase) of the AC motor 13. In this fixed coordinate system, which is set on the basis of the W-phase, it is possible to express an α-axis current is and a β-axis current iβ as represented by the following equations (6) and (7) by using the currents iu, iv and iw of the three phases. Here, the α-axis is in the same direction as an axis of the sensor phase (W-phase axis) and the β-axis is perpendicular to the sensor phase axis (W-phase axis). K is a conversion factor.

$$i\alpha = K \times \{iw - (\frac{1}{2}) \times iu - (\frac{1}{2}) \times iv\} = K \times (3/2) \times iw \tag{6}$$

$$i\beta = K \times ((\sqrt{3}/2) \times iu - \sqrt{3}/2 \times iv) \tag{7}$$

The following equation (8) is derived by using the sensed current iw.sns of the sensor phase (W-phase) as the W-phase current iw in the equation (6). Further, the following equation (9) is derived by using, as the U-phase current iu and the V-phase current iv of the equation (7), the U-phase command current iu* and the V-phase command current iv*, which are determined by an inverse d-q conversion based on the electrical angle eθ, the d-axis command current id* and the q-axis command current iq* of the AC motor 13.

$$i\alpha = K \times (3/2) \times iw.sns \tag{8}$$

$$i\beta = K \times ((\sqrt{3}/2) \times iu^* - \sqrt{3}/2 \times iv^*) \tag{9}$$

A sensor phase reference current phase xθ, that is, a current phase xθ relative to the W-phase, can be calculated from the currents iα and iβ according to the following equation (10). For the calculation of the current phase xθ as $\tan^{-1}$, this phase may, depending on the definition of the currents is and iβ, not be an angle synchronous with the W-phase. This depends on axis definition (for example, an exchange of the α-axis and β-axis or sign change). In order that the current phase xθ may be 0 degree when the sensed W-phase current iw.sns crosses zero (0 ampere) from the negative polarity to the positive polarity, and that the phase xθ may be 180 degrees (an angle synchronous with the W-phase) when the sensed current iw.sns crosses zero from the positive polarity to the negative polarity, the phase xθ may be calculated after an exchange of the currents iα and iβ or sign handling, or otherwise the phase deviation of ±90 degrees due to the perpendicular relationship may suitably be added directly to or subtracted directly from the phase xθ.

$$x\theta = \tan^{-1}(i\beta/i\alpha) \quad (10)$$

Figure 5:
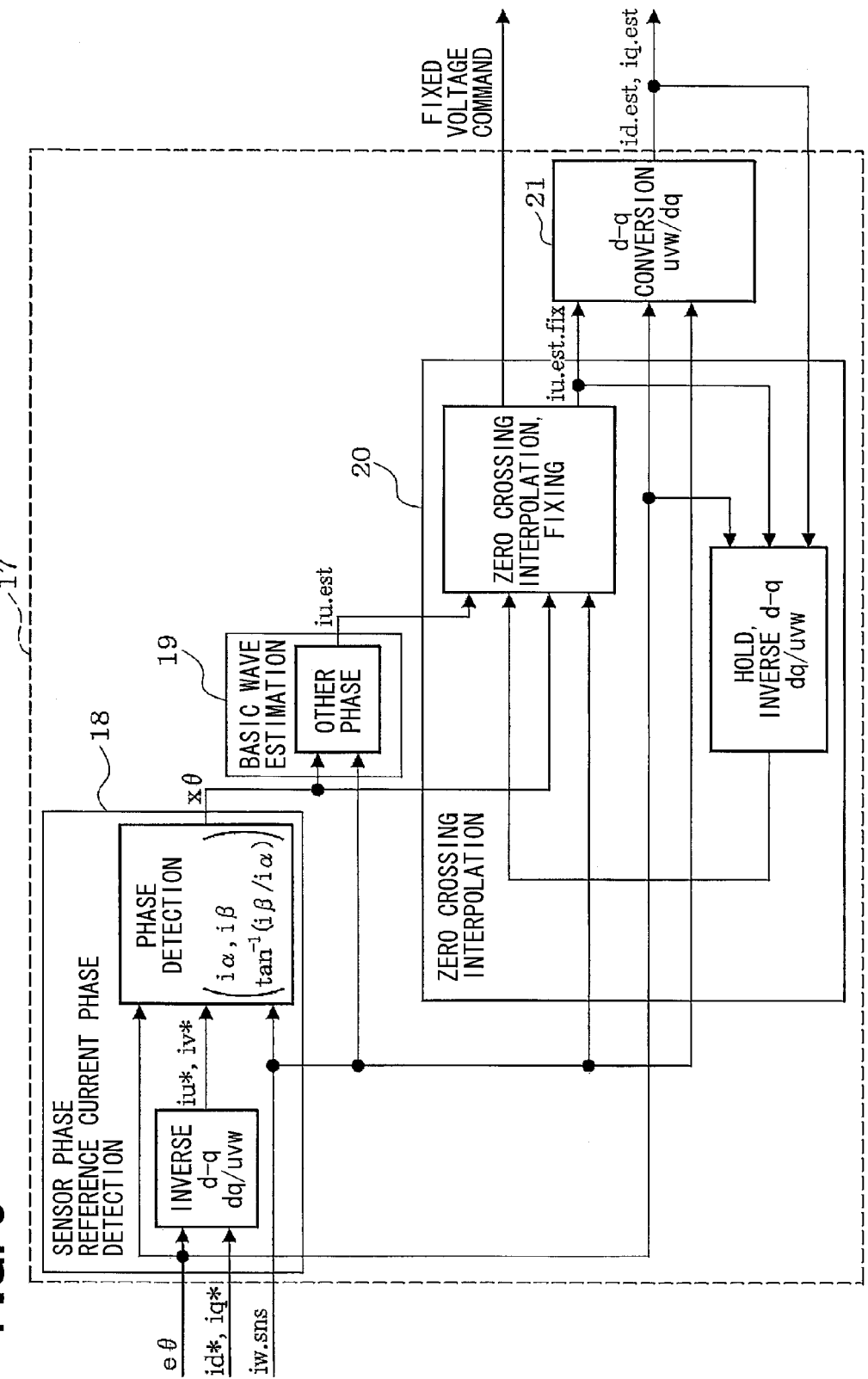
FIG. 5 is a block diagram showing a current estimation part.

In case of estimation of the currents of the other phases than the sensor phase of the AC motor 13, as shown in FIG. 5, a current phase reference current phase detection part 18 calculates the command currents iu* and iv* of other two phases (U-phase and V-phase) by the inverse d-q conversion based on the electrical angle eθ, the d-axis command current id* and the q-axis command current iq* of the AC motor 13. Then, by using the sensed current iw.sns of the sensor phase (W-phase) sensed by the current sensor 15, the α-axis current iα and the q-axis current iβ are calculated by the equation (8) by using the command currents iu* and iv* of the other two phases (U-phase and V-phase). The sensor phase reference current phase xθ is calculated by the equation (10) by using the α-axis current iα and the β-axis current iβ.

Subsequently, the basic wave estimation part 19 calculates the estimation factor fu(xθ) according to the current phase xθ relative to the W-phase according to the equation (5), a data map or the like, and calculates the estimated U-phase current iu.est from the estimation factor fu(xθ) and the sensed W-phase current iw.sns according to the equation (4). Alternatively, the estimation part 19 may calculate an estimated current iu.est in the U-phase directly from the current phase xθ relative to the W-phase and the sensed W-phase current iw.sns according to the equation (3).

Generally, if an operational equation is packaged in a processing unit such as a control ECU (microcomputer), the unit processes the equation with discrete time, not continuous time, and handles sensed values and computed values as discrete values based on a specified resolution (LSB). Therefore, if a division by zero occurs in the equation (3), it is preferable to set a limit to the estimation factor fu(xθ) or the term 1/tan(xθ) in the factor in order to prevent the estimated current from being calculated as an unintended value under the influence of the discrete system. For the implementation of the equation (3), it is effective to map the estimation factor fu(xθ) or the term 1/tan(xθ) in this factor with the argument xθ in order to avoid multiplications and divisions, which are high in processing load. In this case, it is preferable to set a limit to the estimation factor fu(xθ) or the term 1/tan(xθ) on the map. Such measures facilitate application to a discrete system, making it possible to minimize the processing load on the microcomputer. Consequently, there is no need to replace the microcomputer with an expensive one that is high in processing performance.

Subsequently, if the sensed W-phase current iw.sns is 0 ampere, the zero-crossing time point interpolation part 20 interpolates the estimated current iu.est calculated as 0 ampere according to the equation (3) or (4) in the U-phase. Normally (when the W-phase current iw does not cross zero as will be described below), the interpolation part 20 directly outputs the estimated U-phase current iu.est input from the basic wave estimation part 19. When the W-phase current iw crosses zero (when the sensed current iw.sns is 0 ampere or in a specified range that includes 0 ampere and may be 10 amperes, 5 LSB, or another suitably set range, or be specified according to a numerical equation or the like), the interpolation part 20 fixes d-axis command voltage Vd and the q-axis command voltage Vq for the AC motor 13, interpolates the estimated U-phase current iu.est, outputs the interpolated current, and sets the interpolated current as an estimated current iu.est.fix in the U-phase for the d-q conversion. Alternatively, the interpolation part 20 may interpolate the estimated U-phase current iu.est by directly holding it at the previous value or a previous value of it. Alternatively, the interpolation part 20 may interpolate the estimated U-phase current iu.est by: holding the d-axis estimated current id.est and q-axis current iq.est at the previous values or previous values of them; performing an inverse d-q conversion for calculating the estimated U-phase current iu.est from the held currents id.est and iq.est; and interpolating the estimated U-phase current iu.est with the estimated currents obtained in the three phases by the inverse d-q conversion. The estimated U-phase current iu.est may be interpolated by being calculated by a part other than mentioned in this embodiment, or be interpolated by another suitable method.

Subsequently, the d-q conversion part 21 calculates the d-axis estimated current id.est and q-axis current iq.est by means of the d-q conversion from the sensed W-phase current iw.sns and the estimated U-phase current iu.est.fix for this conversion.

This avoids sharp fluctuations in the estimated U-phase current iu.est by interpolating it even if it cannot be calculated accurately when the W-phase current iw crosses zero. Mere interpolation of the estimated U-phase current iu.est may make the current feedback control of the AC motor 13 unstable due to an error (estimation error made by the interpolation). However, the fixation of the command voltage Vd, Vq for the motor 13 excludes the influence of the error in the estimated U-phase current iu.est (prevents the command voltages Vd and Vq from fluctuating due to the error).

Figure 6:
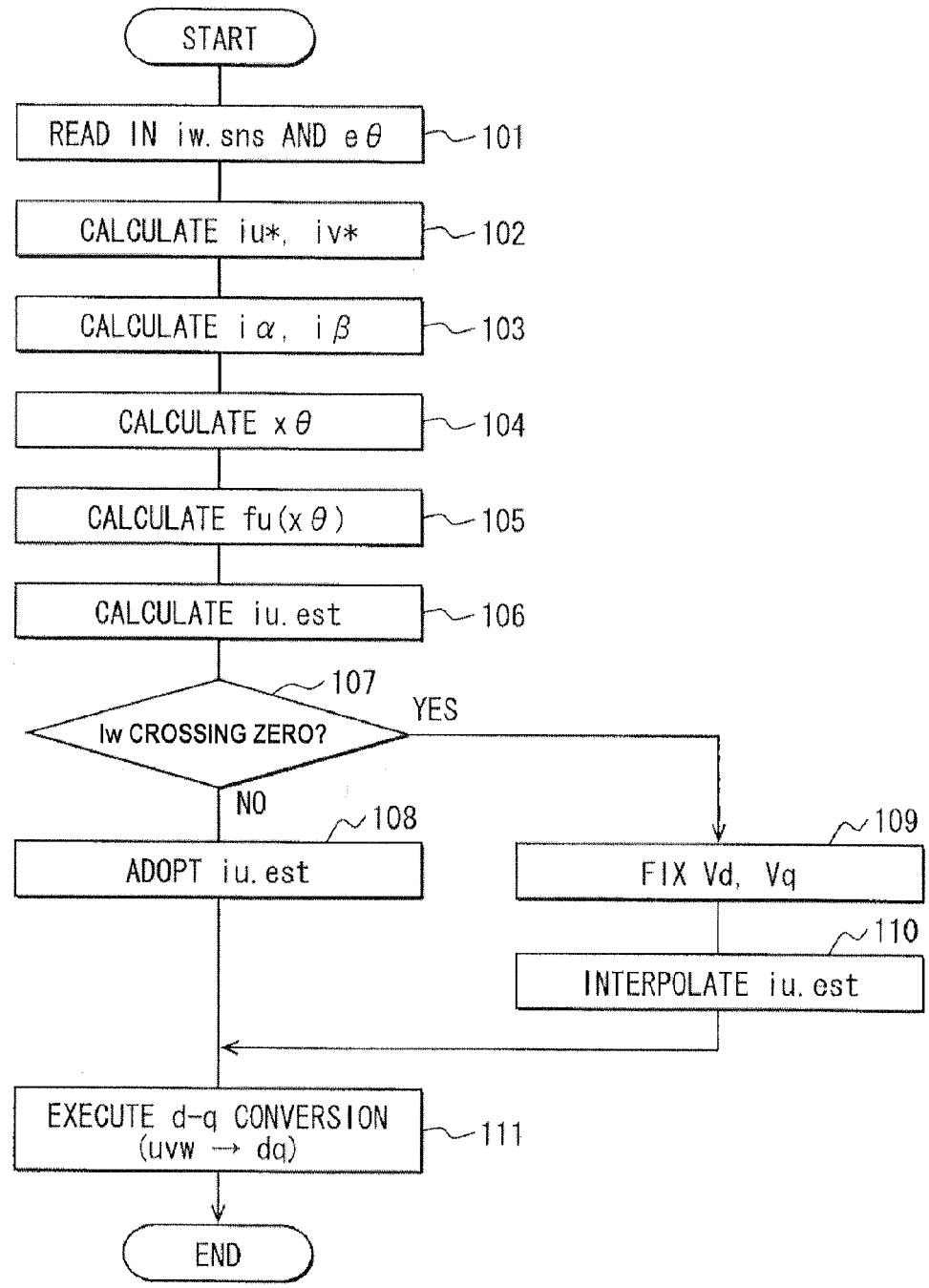
FIG. 6 is a flowchart showing processing of a current estimation routine.

The motor control circuit 16 performs the foregoing current estimation in this embodiment according to a current estimation routine shown in FIG. 6.

The motor control circuit 16 repeats the current estimation routine at a specified operation period while the circuit is on. When the routine is started, the motor control circuit 16 reads in at step 101 the current iw.sns sensed in the W-phase by the current sensor 15 and the electrical angle eθ determined from the rotational rotor position mθ sensed by the rotational position sensor 14.

Then at step 102, the inverse d-q conversion is executed to calculate the command currents iu* and iv* of the other two phases (U-phase and V-phase) based on the electrical angle eθ, the d-axis command current id* and the q-axis command current iq* of the AC motor 13.

At the following step 103, the α-axis current iα is calculated by the equation (8) by using the sensed current iw.sns of the sensor phase (W-phase). Further the β-axis current iβ is calculated by the equation (9) by using the command currents iu* and iv* of the other two phases (U-phase and V-phase). At step 104, the sensor phase reference current phase xθ is calculated by the equation (10) by using the α-axis current iα and the β-axis current iβ.

Subsequently, the current estimation routine proceeds to step 105, where the motor control circuit 16 calculates the estimation factor fu(xθ) according to the current phase xθ relative to the W-phase according to the equation (5) or the data map. Subsequently, the routine proceeds to step 106, where the motor control circuit 16 calculates the estimated current iu.est in the U-phase from the estimation factor fu(xθ) and the sensed W-phase current iw.sns according to the equation (4). Alternatively, the motor control circuit 16 may calculate an estimated current iu.est in the U-phase from the current phase xθ and the sensed W-phase current iw.sns according to the equation (3).

Subsequently, the current estimation routine proceeds to step 107, where the motor control circuit 16 checks whether the W-phase current iw is crossing zero. The checking depends on whether the sensed W-phase current iw.sns is 0 ampere. Alternatively, the checking may depend on whether the sensed W-phase current iw.sns is within the specified range including 0 ampere (for example, the absolute value of this current is equal to or smaller than a specified value, or the absolute value of the estimation factor fu(xθ) is equal to or larger than a specified value). Alternatively, the checking may depend on the current phase xθ relative to the W-phase because this phase is synchronous with the sensed W-phase current iw.sns.

If the motor control circuit 16 determines at step 107 that the W-phase current iw is not crossing zero, the current estimation routine proceeds to step 108, where the motor control circuit 16 adopts the estimated U-phase current iu.est calculated at step 106.

If the motor control circuit 16 determines at step 107 that the W-phase current iw is crossing zero, the current estimation routine proceeds to step 109, where the current control circuit 16 fixes the command voltages Vd and Vq. At step 109, the motor control circuit 16 may fix the command voltages Vd and vq directly (for example, by holding them at the previous values) or by forcing the d-axis current deviation Δid and the q-axis current deviation Δiq (FIG. 3) to be 0 [A].

Subsequently, the current estimation routine proceeds to step 110, where the motor control circuit 16 interpolates the estimated U-phase current iu.est. At this step, the motor control circuit 16 may interpolate the estimated U-phase current iu.est by directly holding it at the previous value of it. Alternatively, the motor control circuit 16 may interpolate the estimated U-phase current iu.est by: holding the d-axis estimated current id.est and q-axis current iq.est at the previous values of them; performing an inverse d-q conversion for calculating the estimated U-phase current from the held currents id.est and iq.est; and interpolating the estimated U-phase current iu.est with the estimated currents obtained by the conversion. The estimated U-phase current iu.est may be interpolated by being calculated by means of other logic, or be interpolated by another suitable method.

After the motor control circuit 16 sets at step 108 or 110 the estimated U-phase current iu.est as the estimated U-phase current iu.est.fix for a d-q conversion, the current estimation routine proceeds to step 111, where the circuit executes the d-q conversion for calculating the d-axis estimated current id.est and q-axis current iq.est from the sensed W-phase current iw.sns and the estimated U-phase current iu.est.fix.

Figure 7:
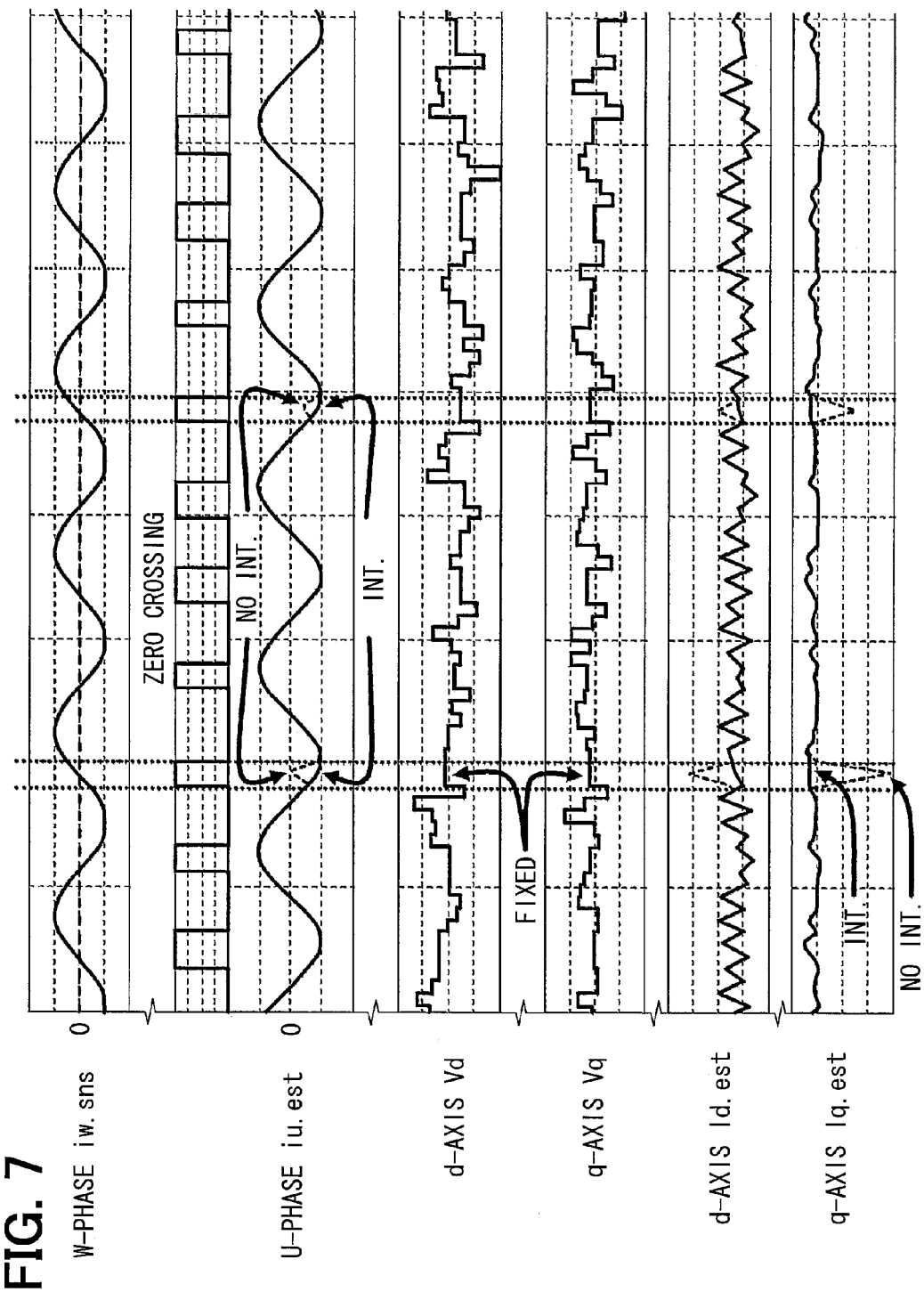
FIG. 7 is a time chart showing an operation of the embodiment when an interpolation is executed at a zero-crossing time of a sensor phase current.

According to the first embodiment, as shown in FIG. 7, at the zero-crossing time of the sensor phase current iw.sns, the d-axis command voltage Vd and the q-axis command voltage Vq for the AC motor 13 are fixed and the estimated current iu.est of the U-phase, which corresponds to the other phase or the second phase, is interpolated. The zero-crossing time includes that the sensed current iw.sns of the sensor phase is 0 [A] or in the predetermined range including 0 [A]. The predetermined range may be arbitrarily set to, for example, 10 [A] or 5 LSB. Even when it is hardly possible to accurately calculate the estimated current iu.est of the U-phase cannot be calculated at the zero-crossing time of the sensor phase, the estimated current iu.est of the U-phase can be restricted from rapidly changing. It is likely that the current F/B control for the AC motor 13 becomes unstable due to the error of the estimated current iu.est (estimation error caused by interpolation), when the estimated current iu.est of the U-phase is only interpolated. By fixing the d-axis and the q-axis command voltages Vd and Vq of the AC motor 13, it is possible to eliminate an influence of error in the estimated current iu.est (to prevent variation of the command voltages Vd and Vq caused by the error in the estimated current iu.est). Thus, the current F/B control of the AC motor 13 can be stabilized at the zero-crossing time of the sensor phase current.

In a certain driving system, the d-axis estimated current id.est and the q-axis estimated current iq.est are used in other controls such as determination of a control state or protection of devices, which is different from the current F/B control. In such a system, even if the d-axis and the q-axis command voltages Vd and Vq are fixed, the other control, which uses the d-axis estimated current id.est and the q-axis estimated current iq.est, will be adversely affected, when the d-axis and the q-axis estimated currents id.est and iq.est fluctuate.

To counter this problem, the d-axis and the q-axis command voltages Vd and Vq may be fixed and the d-axis and the q-axis estimated currents id.est and iq.est may be held at the previous values or more previous values (which are two times or three times earlier). Further the estimated current iu.est.fix of the U-phase and the d-axis and the q-axis estimated currents id.est and iq.est may be used. The estimated current iu.est.fix of the U-phase is calculated by interpolating the estimated current iu.est of the U-phase by the estimated current of the U-phase, which is calculated by the inverse d-q conversion of the d-axis and the q-axis estimated currents id.est and iq.est by the previous values or more previous values. The d-axis and the q-axis estimated current values id.est and iq.est are calculated by the further d-q conversion by the sensed current iw.sns of the sensor phase (W-phase). According to this countermeasure, the d-axis and the q-axis estimated currents id.est and iq.est are restricted from varying at the zero-crossing time of the sensor phase current. Further, the other control, which uses the d-axis and the q-axis estimated currents id.est and the iq.est (for example, determination of a control state or protection of a device, which is other than the current F/B control), can be protected from being adversely affected.

Second Embodiment

A second embodiment will be described with reference to FIG. 8. In this embodiment, substantially the same parts as in the first embodiment are simplified or not described and only different parts will be described.

In the first embodiment, the AC motor 13 is used in the driving system, in which the AC motor 13 is driven by the sine wave PWM control method for example. In this system, the command voltages Vd and Vq for the AC motor 13 are calculated by using the d-axis and the q-axis estimated currents id.est and iq.est. In the second embodiment, however, the AC motor 13 is used in a driving system, in which the AC motor 13 is driven by a square wave control method (one pulse switching in one current supply cycle period) for example. In this system, a command voltage phase ψ of the AC motor 13 is calculated based on the d-axis and the q-axis estimated currents id.est and iq.est.

In the second embodiment, the motor control circuit 16 (FIG. 2) performs F/B control (torque F/B control) by sensing the current flowing in the sensor phase of the AC motor 13 so that a deviation between a command torque and an estimated torque is reduced. The torque estimation value is estimated based on the outputs of the current sensor 15 of one phase and the rotational position sensor 14.

Figure 8:
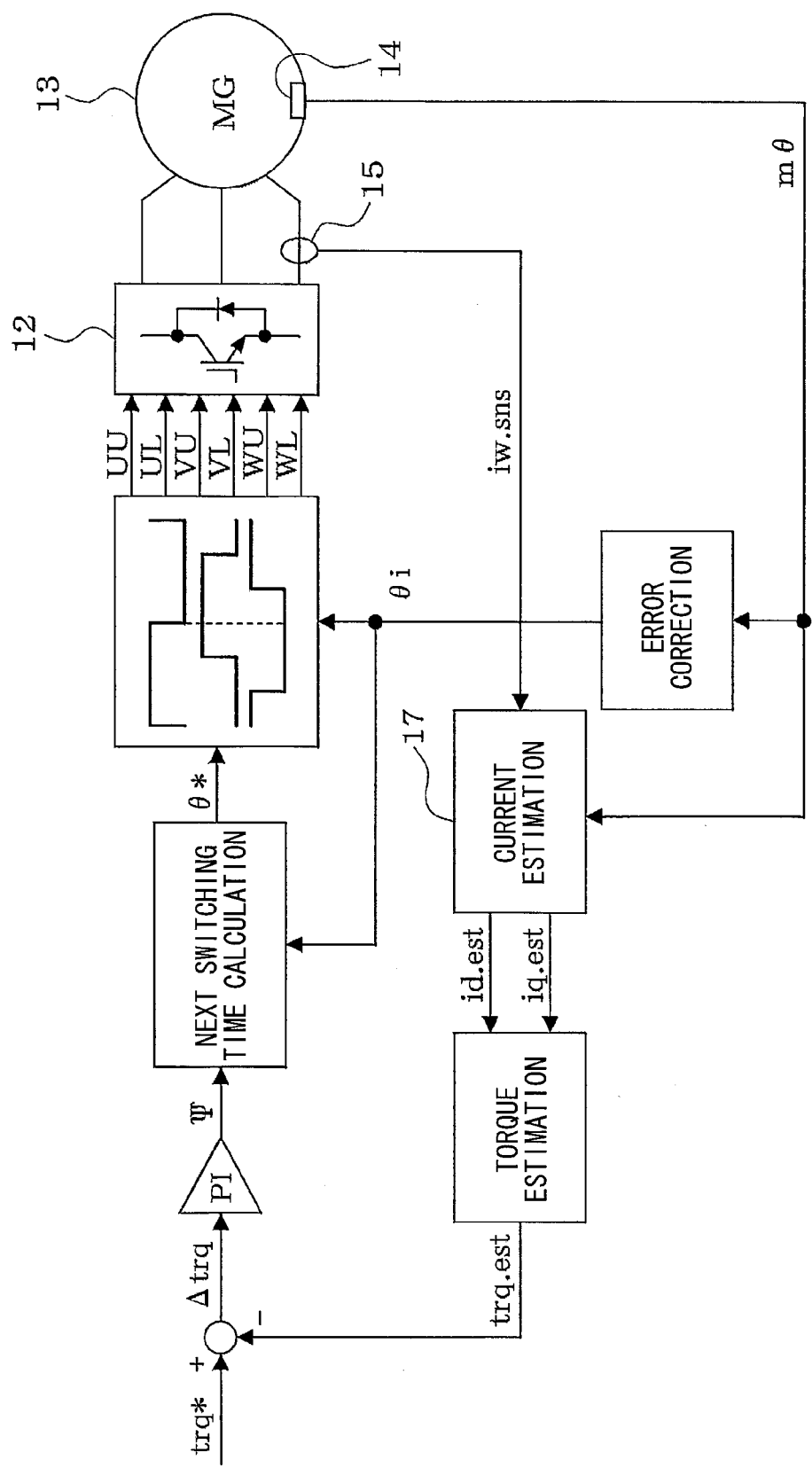
FIG. 8 is a block diagram showing a torque feedback control for an AC motor according to a second embodiment.

As shown in FIG. 8, the motor control circuit 16 calculates the rotational position signal θi (this is converted to the electrical angle eθ by an error correction part to determine a switching time by a current period) by correcting the error in the rotational position mθ (rotational angle) of the AC motor 13 sensed by the rotational position sensor 14. The motor control circuit 16 further calculates, by the current estimation part 17, the estimated current iu.est of the other phase (U-phase) based on the sensed current iw.sns of the sensor phase (W-phase) and the electrical angle eθ calculated from the rotational position mθ. The motor control circuit 16 still further calculates the d-axis estimated current id.est and the q-axis estimated current iq.est based on the sensed current iw.sns of the W-phase and the estimated current iu.est of the U-phase. This control may be attained without using the command currents. In such a case, the current estimation part 17 estimates the estimated current iu.est of the U-phase by a current estimation method different from that in the first embodiment. This method, which does not necessitate the command current, may be used as well in the first embodiment.

Then, the estimated torque trq.est is calculated by a data map or mathematical equations based on the d-axis and the q-axis estimated currents id.est and iq.est. Further, the command voltage phase ψ (phase command value of the voltage vector) is calculated by the PI control so that the deviation Δtrq between the command torque trq* and the estimated torque trq.est is reduced. The next switching time point θ* is calculated based on the command voltage phase ψ and the rotational position angle θi. Then the three-phase six-arm voltage command signals UU, UL, VU, VL, WU and WL are generated by the square wave control method based on the switching time point θ* and the rotational position angle θi. These three-phase six-arm voltage command signals UU, UL, VU, VL, WU and WL are outputted to the inverter 12.

According to the second embodiment, at the zero-crossing time of the W-phase current, the command voltage phase ψ of the AC motor 13 is fixed and the estimated current iu.est of the U-phase is interpolated (for example, held at the previous value). The zero-crossing time includes a case, in which the sensed current iw.sns is 0 [A] or in the predetermined range including 0 [A]. The predetermined range may be arbitrarily set to 10 [A] or 5 LSB. Alternatively, the predetermined range may be specified by an equation or the like. The command voltage phase ψ may be directly fixed (for example, held to the previous value) or may be fixed by forcibly setting the torque deviation Δtrq to 0 [N·m].

Thus, even when the estimated current iu.est of the U-phase cannot be calculated accurately, it is possible to avoid rapid variation of the estimated current iu.est of the U-phase by interpolating the estimated current iu.est of the U-phase. It is likely that the torque F/B control of the AC motor 13 becomes unstable due to error in the estimated current iu.est (estimation error caused by interpolation), when the estimated current iu.est of the U-phase is simply interpolated. Since the command voltage phase ψ of the AC motor 13 is fixed, the influence of the error in the estimated current iu.est can be eliminated (variation of the command voltage phase ψ caused by the error in the estimated current iu.est can be prevented). As a result, the torque F/B control of the AC motor 13 at the zero-crossing time of the W-phase current can be stabilized.

At the zero-crossing time of the W-phase current, not only the command voltage phase ψ is fixed but also the d-axis and the q-axis estimated currents id.est and iq.est may be held at the respective previous values or further previous values (two or three times older values). Thus, at the zero-crossing time of the sensor phase current, the d-axis and the q-axis estimated currents id.est and iq.est are prevented from varying. This will avoid an adversary influence on the other control (for example, determination of a control state or protection of a device other than the torque F/B control), which uses the d-axis and the q-axis estimated currents id.est and I.est.

It is also possible to interpolate the estimated current of the U-phase of the zero-crossing time by a current estimation interpolation value of the U-phase derived by an inverse d-q conversion performed by holding the previous values of the d-axis and the q-axis estimated currents id.est and iq.est, and to use the d-axis and the q-axis estimated currents id.est and iq.est derived by a further d-q conversion performed by the interpolated estimated current iu.est.fix of the U-phase and the sensed current iw.sns of the W-phase. The estimated current iu.est of the U-phase may be interpolated by other means different from that of the second embodiment and may be interpolated by other arbitrary methods.

In the first and the second embodiments, the command value (command voltage or command voltage phase) related to the voltage of the AC motor 13 is fixed at the zero-crossing time of the sensor phase current. However the estimated current of the other phase may be interpolated by holding the d-axis and the q-axis estimated currents id.est and iq.est at the respective previous values or further older values (two or three times older values) without fixing the command related to the voltage of the AC motor 13. It is confirmed that, in a case that the accuracy of calculation of the sensor phase reference current phase xθ is high, the same advantage is provided whether the d-axis and the q-axis estimated currents id.est and iq.est are held at the previous values or further older values or the command related to the voltage of the AC motor 13 is fixed (first and second embodiments).

Further, in a case that the accuracy of calculation of the sensor phase reference current phase xθ is high, the current F/B control or the torque F/B control may be performed by using the estimated current iu.est.fix of the other phase (U-phase) and the d-axis and the q-axis estimated currents id.est and iq.est. The estimated current iu.est.fix of the other phase is calculated by interpolating the estimated current iu.est of the other phase of the zero-crossing time by the current estimation interpolation value of the other phase, which is derived by the inverse d-q conversion of the d-axis and the q-axis estimated currents id.est and iq.est held at the previous values or older values.

In the above-described embodiments, the current of the other phase is estimated based on the sensed current of one phase. As a result, influence of gain error of the current sensor is eliminated, although it is caused in the conventional AC motor control system using plural current sensors. Thus, output torque variation of the AC motor caused by the gain error can be eliminated and hence vehicle vibration can be eliminated.

The AC motor control method is not limited to the control methods described above. The AC motor may be controlled by other methods, which may be square wave control, PWM control, over-modulation mode or PWM control.

The estimated current of the other phase is not limited to the calculation based on the sensed current of the sensor phase described above but may be calculated differently. The above-described embodiments are advantageous in any methods, in which a value is divided by 0 in calculation of the estimated current, or the estimated current of the other phase becomes 0 [A] when the sensed current of the sensor phase is 0 [A].

In the above-described embodiments, the zero-crossing time of the sensor phase current is determined based on the sensed current of the sensor phase. However, since the sensor phase reference current phase is synchronized with the sensor phase current, the zero-crossing time may be determined based on the phase value of the sensor phase reference current phase. Information to be used in the determination of the zero-crossing time of the sensor phase current is not limited to only the sensor phase current.

In the above-described embodiments, the current sensor 15 senses the current in the W-phase as the sensor phase. Alternatively, the sensor 15 may be connected to sense the current in the U-phase or V-phase as the sensor phase. In these embodiments, the motor control circuit 16 calculates the estimated current in the U-phase as the other phase. Alternatively, the motor control circuit 16 may calculate an estimated current in the V-phase or W-phase as the other phase. Further, the motor control circuit 16 may calculate estimated currents in two phases other than the sensor phase.

In the above-described embodiments, the AC motor control apparatus is assumed to be provided with only one inverter and only one AC motor. However, the apparatus may be provided with two or more inverters and two or more AC motors. Alternatively, the apparatus may include an inverter and two or more AC motors connected in parallel to the inverter, as exemplified in an electric train.

In order to prevent the d-q conversion from being disabled because of the current sensed in only one phase, the d-q conversion is enabled by estimating the current in a different phase. Alternatively, a new d-q conversion equation may be created that is effective even for the current sensed in only one phase. However, either method provides a mathematically equal result.

The apparatus is not limited to hybrid vehicles of the structure shown in FIG. 1. The apparatus can be applied to hybrid and electric vehicles of any structure. The apparatus is not limited to the AC motor control apparatus fitted on an electric vehicle or a hybrid vehicle but can be applied to other AC motor control apparatus as well.

What is claimed is:

1. An AC motor control apparatus for a system, which includes a three-phase AC motor having a first phase, a second phase and a third phase, and a current sensor for sensing a current flowing in the first phase, the AC motor control apparatus comprising:
   a current estimating part configured to calculate an estimated current of at least the second phase based on a sensed current of the first phase and electrical angle of the AC motor and calculate a d-axis estimated current and a q-axis estimated current in a rotating coordinate system of the AC motor based on the sensed current of the first phase and the estimated current of at least the second phase; and
   a controlling part configured to control electric power supply to the AC motor by using the d-axis estimated current and the q-axis estimated current,
   wherein the current estimating part includes an interpolation part configured to interpolate the estimated current of at least the second phase by fixing a command related to a voltage of the AC motor and holding the estimated current at previous or older values thereof at a zero-crossing time of the sensed current of the first phase, the zero-crossing time including a case in which the current detection value of the first phase is 0 or in a predetermined range including 0.

2. The AC motor control apparatus according to claim 1, wherein:
   the interpolation part is further configured to hold the d-axis estimated current and the q-axis estimated current at previous or further older values thereof, respectively, at the zero-crossing time of the sensed current of the first phase.

3. The AC motor control apparatus according to claim 2, wherein:
   the controlling part is configured to calculate a d-axis command voltage and a q-axis command voltage by using the d-axis estimated current and the q-axis estimated current and control the AC motor based on the command voltages; and
   the interpolation part is configured to fix the d-axis command voltage and the q-axis command voltage as the command related to the voltage of the AC motor at the zero-crossing time of the sensed current of the first phase.

4. The AC motor control apparatus according to claim 2, wherein:
   the controlling part is configured to calculate a command voltage phase of the AC motor by using the d-axis estimated current and the q-axis estimation value and control power supply to the AC motor based on the command voltage phase; and
   the interpolation part is configured to fix the command voltage phase as the command related to the voltage of the AC motor at the zero-crossing time of the sensed current of the first phase.

5. The AC motor control apparatus according to claim 1, wherein:
   the controlling part is configured to calculate a d-axis command voltage and a q-axis command voltage by using the d-axis estimated current and the q-axis estimated current and control the AC motor based on the command voltages; and
   the interpolation part is configured to fix the d-axis command voltage and the q-axis command voltage as the command related to the voltage of the AC motor at the zero-crossing time of the sensed current of the first phase.

6. The AC motor control apparatus according to claim 1, wherein:
   the controlling part is configured to calculate a command voltage phase of the AC motor by using the d-axis estimated current and the q-axis estimation value and control power supply to the AC motor based on the command voltage phase; and
   the interpolation part is configured to fix the command voltage phase as the command related to the voltage of the AC motor at the zero-crossing time of the sensed current of the first phase.

7. The AC motor control apparatus according to claim 1, wherein the current estimating part includes:
   a calculation part configured to calculate, in a fixed coordinate system, an $\alpha$-axis current based on the sensed current of the sensor phase, a $\beta$-axis current based on a current command value of at least the second phase, a current phase relative to the first phase based on the $\alpha$-axis current and the $\beta$-axis current, and the estimated current of at least the second phase based on a calculated current phase and the sensed current of the first phase, the fixed coordinate system being defined by an α-axis and a β-axis which are in a same direction as and in an orthogonal direction to an axis of the first phase, respectively.

8. The AC motor control apparatus according to claim 1, wherein the current estimating part includes:
a calculation part configured to calculate the estimated current value of at least the second phase based on the sensed current of the first phase, the electrical angle of the AC motor and both of a d-axis current command value and a q-axis current command value in the rotating coordinate system of the AC motor, and calculate the d-axis estimated current and the q-axis estimated current based on the sensed current of the first phase and the estimated current of at least the second phase.

9. The AC motor control apparatus according to claim 1, wherein:
the current sensor is provided for sensing the current flowing only in the first phase; and
the current estimating part is configured to calculate the estimated current of each of the second phase and the third phase.

10. An AC motor control apparatus for a system, which includes a three-phase AC motor having a first phase, a second phase and a third phase, and a current sensor for sensing a current flowing in the first phase, the AC motor control apparatus comprising:
a current estimating part configured to calculate an estimated current of at least the second phase based on a sensed current of the first phase and electrical angle of the AC motor and calculate a d-axis estimated current and a q-axis estimated current in a rotating coordinate system of the AC motor based on the sensed current of the first phase and the estimated current of at least the second phase; and
a controlling part for controlling electric power supply to the AC motor by using the d-axis estimated current and the q-axis estimated current,
wherein the current estimating part includes an interpolation part configured to hold the d-axis estimated current and the q-axis estimated current at previous or further older values thereof, respectively, and interpolates the estimated current of at least the second phase based on held values at a zero-crossing time of the sensed current of the first phase, the zero-crossing time including a case in which the current detection value of the first phase is 0 or in a predetermined range including 0.

* * * * *